W. G. TURNER.
MEANS OF APPLYING BALE TIES.
APPLICATION FILED MAY 25, 1918.
1,332,644.
Patented Mar. 2, 1920.
2 SHEETS—SHEET 1.
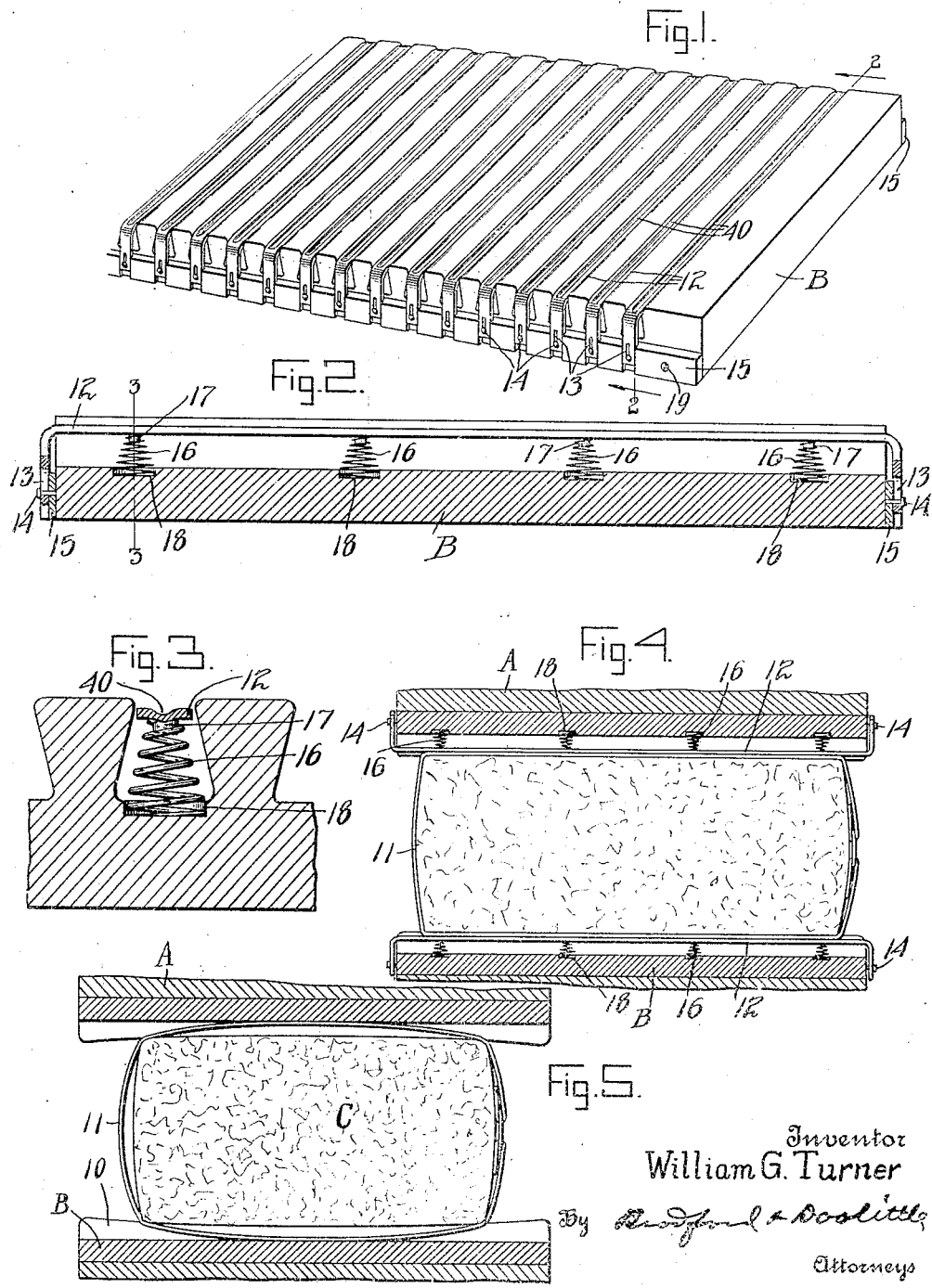
Inventor
William G. Turner
By
Attorneys W. G. TURNER.
MEANS OF APPLYING BALE TIES.
APPLICATION FILED MAY 25, 1918.
1,332,644.
Patented Mar. 2, 1920.
2 SHEETS—SHEET 2.
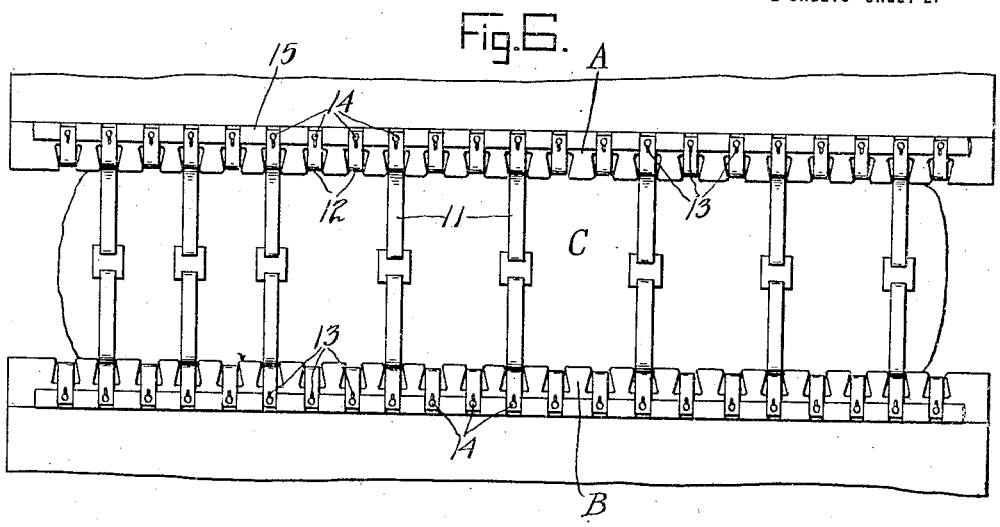
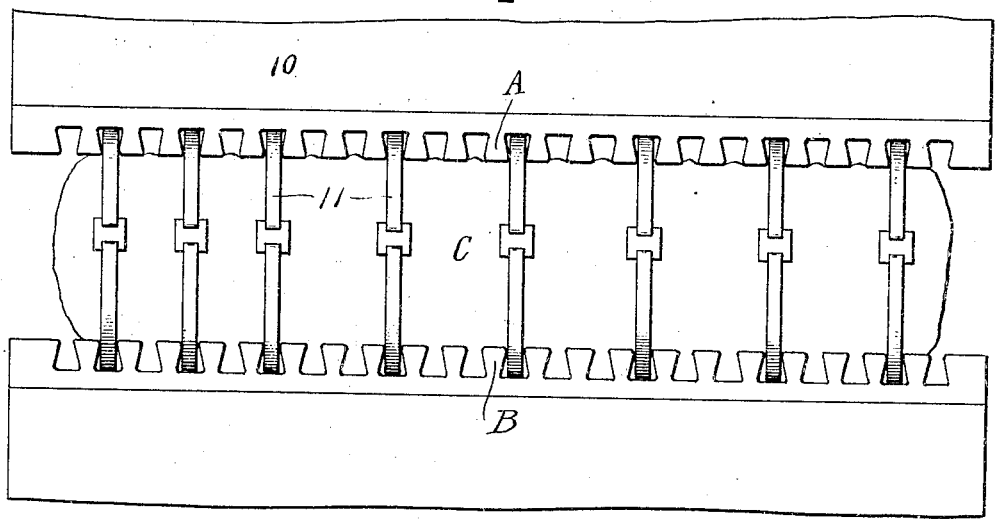
Inventor
William G. Turner
By Bedford & Doolittle
Attorneys

UNITED STATES PATENT OFFICE.

WILLIAM GRUBB TURNER, OF MEMPHIS, TENNESSEE.

MEANS OF APPLYING BALE-TIES.

1,332,644. Specification of Letters Patent. Patented Mar. 2, 1920.

Application filed May 25, 1918. Serial No. 236,592.

*To all whom it may concern:*

Be it known that I, WILLIAM GRUBB TURNER, a citizen of the United States, residing at Memphis, Shelby county, and State of Tennessee, have invented and discovered certain new and useful Improvements in Means of Applying Bale-Ties, of which the following is a specification.

The conservation of space in freight cars, steamships and other freight transportation equipment is always a consideration of great importance but at the present time, due to the unusual demands upon such equipment, far exceeding its capacity, it is of utmost importance. The handling of the cotton crop, comprising an average of about 14,000,000 bales per annum, creates a demand upon transportation equipment among the largest created by any single item of freight required to be handled.

The handling of cotton in bales has for many years presented problems that have caused those engaged in the business much study to the end that a bale of uniform size and uniform density, and density of the highest practical degree, might be secured, primarily for the purpose of conserving space in the equipment, and secondarily for convenience and reduction of expense in handling.

As is well known, cotton comes from gins, located at convenient points in the cotton producing sections of the country, to central warehouses from which the ultimate distribution takes place. The cotton is baled at the gin in bales which are intended to be of substantially uniform dimensions but of varying density. Actual experience, however, shows that the bales vary considerably in size as well as in density.

Heretofore a density ranging from approximately 22½ to 25 pounds of cotton to the cubic foot has been about the maximum that has been practical to attain through the medium of the compresses used at the warehouses for re-pressing the bales of cotton as they come from the cotton gins. I have ascertained that the maximum density reached in the operation of re-pressing by the compress machines is approximately 55 pounds to the cubic foot. It is recognized by all having experience in this line of work that it is desirable to retain all of this density that is possible. Heretofore, however, it has been impractical to so apply the stiff, springy metal ties as to retain more than substantially the density above referred to, that is, 22½ to 25 pounds per cubic foot.

I have by long years of experience, study and experiment, devised a method practised through the medium of simple attachments to the platens of an ordinary compress, whereby the ties may be applied to the bale in such a manner that the expansion of the bale after the jaws of the compress are released is not sufficient to reduce the density below from 33 to 35 pounds per cubic foot and I frequently secure density of approximately 40 pounds per cubic foot. This achievement results in enabling approximately one-third of the space heretofore required for the shipment of the cotton crop to be saved, or, to put it another way, enables the same volume of cotton to be shipped in two-thirds of the space heretofore required for such shipment. In handling a crop of the magnitude of our cotton crop the saving in shipping space is of the utmost importance and great value.

I will now proceed to describe my said invention which is illustrated by the accompanying drawings, wherein—

Figure 1 represents the lower platen of an ordinary cotton compress,

Fig. 2 a cross section through the same on the dotted line 2—2 in Fig. 1,

Fig. 3, a detailed section on the dotted line 3—3 in Fig. 2,

Fig. 4 a cross section through a compress employing my said attachments and showing a bale of cotton therein with a tie attached or buckled as just before the bale is released, Fig. 5, a view similar to Fig. 4 showing the compress without my said attachment and the tie bulged out in the position it occupies after being buckled and just before the bale is released, Fig. 6, an edge view of a compress with my attachment as it appears just before the bale is released, and Fig. 7, an edge view of a compress of the construction usually employed showing the bale in edge view with the ties buckled as it appears before the bale is released.

In said drawings the portions marked A represent the upper platen, B the lower platen, and C the bale of cotton.

In all cotton compresses which have been in use for many years the platens, both upper and lower, are formed with a series of transverse channels 10 of considerable depth and somewhat wider at the bottom than at the top. These channels are for a two fold purpose; first, to allow the metal ties, which consist almost invariably of flat iron bands, to be inserted on opposite sides of the bale after the bale has been pressed to the required density; second, to provide air spaces for the escape of air that may be confined in the bale and is forced out under the extreme pressure developed in the compress operation. This latter purpose is essential to attain the highest possible degree of density of the cotton itself.

By the usual method the tie 11 is doubled and bent at the points approximately where the corners of the bale are intended to come and the ends are threaded through these transverse channels at points regular distanced apart until 8 bands or ties have been threaded around the bale. It may be explained that the bales as they come from the gins have six ties or bands. After the bale is placed in the compress these ties are cut and removed. Portions are cut from each to reduce their lengths to the requirements of the reduced size of the bales. These portions are riveted together and form two additional ties, which are used on the repressed bales in order to maintain the original weight of the bale. This is the chief reason for eight ties on compressed bales whereas only six are applied on the bales at the gins.

The work of putting the ties in place is usually done by manual labor, three men standing on the rear side of the compress and four on the front side. The men in the rear of the bale shove the ends of the ties through until they project on the front side when the men on the front side seize the ends and pull them as taut as possible, doubling their ends around the buckle and coupling the ends together through the medium of said buckle in any usual or approved manner. The ties being of a comparatively stiff material and inherently of spring character, expand or bulge during the process of buckling or as soon as the pull thereon is relaxed until the ties bear upon the floor of the channels on opposite sides of the floor and bow out away from the bale on its rear side and on its front side, as illustrated in Fig. 5. No care or skill in the manual operation of these ties has been able to overcome the "slack" thus made necessary in the die during the process of buckling. The result is that when the pressure is relieved the bale expands to take up all slack in said ties and also to slightly embed the ties in the bales, the density of the cotton being during this expansive process of the bale reduced from approximately 55 pounds to the cubic foot to 22½ to 25 pounds, and the size of the bale and the space required for its storage or shipment being correspondingly increased.

In Fig. 1 I have illustrated the lower platen B with its channels 10 occupied by spring mounted filler bars 12, each adapted to normally come to near the face of the platen. The construction of these bars is best shown in Fig. 2, each consisting of a straight metal bar of a width corresponding to the width of the mouth of each channel and having its ends bent at right angles thereto and formed with vertical slots 13 which engage pins 14 set into the edges of the platen, or if preferred, in a longitudinal bar 15 secured to the edge of the platen. Each bar is preferably formed with a central longitudinal groove 40 in its face to accommodate the rivet heads in the spliced ties. Helical springs 16 are interposed between said bars 12 and the floor of the channel being held from displacement at their upper ends by lugs 17 depending from the bars and at their lower ends being mounted in sockets 18 formed in the floor of the channels. These bars normally fill the channels but will usually yield under pressure to accommodate any wad of cotton that may project into one of the channels from the bale under pressure, or to permit the escape of air from any air pocket, each bar being independently and automatically adjustable to the conditions that exist in the bale at its point of location. The helical form of the spring 16 provides for a very flexible operation of said bars 12 and at the same time holds the bars toward the mouth of the channels with sufficient force to accomplish the purpose desired.

In Figs. 1 and 2 I have shown the pins 14 as each carried upon a longitudinal bar 15 secured to the edge of the platen by screws 19. In Fig. 4 I have shown these pins 14 inserted directly in the edge of the platen itself. This is but one of many simple modifications in the mechanical construction that will readily suggest themselves to anyone skilled in the art and which may be employed, where more convenient or expedient for any purpose, without departing from my invention.

In tying a bale of cotton the manipulation of the tie by manual labor is identical whether the filler bars 12 be employed or not, but in the one case the filler bar supplements the manual manipulation to accomplish a result impossible by said manual manipulation itself. By referring to Fig. 4 will be noted a very accurate illustration of the result attained in tying a bale of cotton by means of the manual manipulation supplemented by the operation of the filler bars 12. The operator threads the ties through the appropriate channels as in the other case, and the operator in front of the bale seizes the projecting ends and draws the tie forward until the rear part of the tie binds tightly against the bale. The operator in front having drawn the tie taut must relax his pull upon the tie in order to attach the buckle and connect the loops on the ends of the tie but instead of the tie springing up and bowing outward away from the bale, as in the old method, the spring filler bars 12 press against the tie and hold it against the surface of the bale and retain the forward position of the ends while the manipulator secures the buckle, instead of permitting said ends to withdraw under the spring expansion as allowed by the old method. The buckle being secured and the pressure relieved the expansion of the bale is only such as to reduce its density from the attained 55 pounds per cubic foot, while under full pressure, to a density varying from 33 to 40 pounds per cubic foot, which is a density one-third and more greater than any heretofore achieved by the methods commonly practised.

By this means I am able to accomplish the desired results above referred to and reduce the space required for storing and shipping cotton to the extent stated with the consequent and numerous advantages and saving in expense. In actual practice I am now loading freight cars with 100 to 112 bales per 36 foot car, whereas heretofore 75 bales has been the maximum load.

Having thus fully described my said invention, what I claim as new and desire to secure by Letters Patent, is:

The combination with a platen for a cotton compress having transverse channels, of an attachment therefor comprising longitudinal bars adapted to be secured one on each edge of said platen, said bars carrying a series of filler bars adapted to move in and out in the channels of said platen, and springs mounted between said filler bars and the floors of said channels, substantially as set forth.

In witness whereof I have hereunto set my hand and seal at Washington, District of Columbia, this twenty-second day of May, nineteen hundred and eighteen.

WILLIAM GRUBB TURNER. [L. S.]

Witness:
E. W. BEDFORD.